United States Patent [19]

Sovicka

[11] 4,003,657
[45] Jan. 18, 1977

[54] ROTATING SUPPORT TABLE AND DRIVE FOR AN ECHELLE GRATING

[75] Inventor: Rostislav Sovicka, Prague, Czechoslovakia

[73] Assignee: Ceskoslovenska akademie ved, Prague, Czechoslovakia

[22] Filed: Apr. 7, 1975

[21] Appl. No.: 565,706

[30] Foreign Application Priority Data

Apr. 9, 1974 Czechoslovakia ............... 2543-74

[52] U.S. Cl. .......................... 356/100; 350/162 R; 356/79
[51] Int. Cl.² ........................................... G01J 3/12
[58] Field of Search ............... 356/79, 96, 97, 98, 356/100, 101; 350/162 R

[56] References Cited

UNITED STATES PATENTS

| | | | |
|---|---|---|---|
| 2,948,184 | 8/1960 | Johnson | 356/96 |
| 3,020,794 | 2/1962 | Reichel | 350/162 R |
| 3,414,356 | 12/1968 | Cary | 350/162 R |
| 3,520,614 | 7/1970 | Goldstein | 356/97 |
| 3,594,084 | 7/1971 | Turner | 350/162 R |

OTHER PUBLICATIONS

High Dispersion . . . Echelle Grating; Liller; Applied Optics; vol. 9, No. 10; Oct. 70; pp. 2332-2336.

*Primary Examiner*—Vincent P. McGraw
*Attorney, Agent, or Firm*—Burgess Ryan and Wayne

[57] ABSTRACT

The position of a diffraction grating in a spectral device is controlled by an arm fixed to a rotatable table supporting the grating. The arm rests against a cam receiving a straight line motion in a direction parallel to the light beam impinging on the grating and passing beyond the rotation axis of the rotatable table.

7 Claims, 1 Drawing Figure

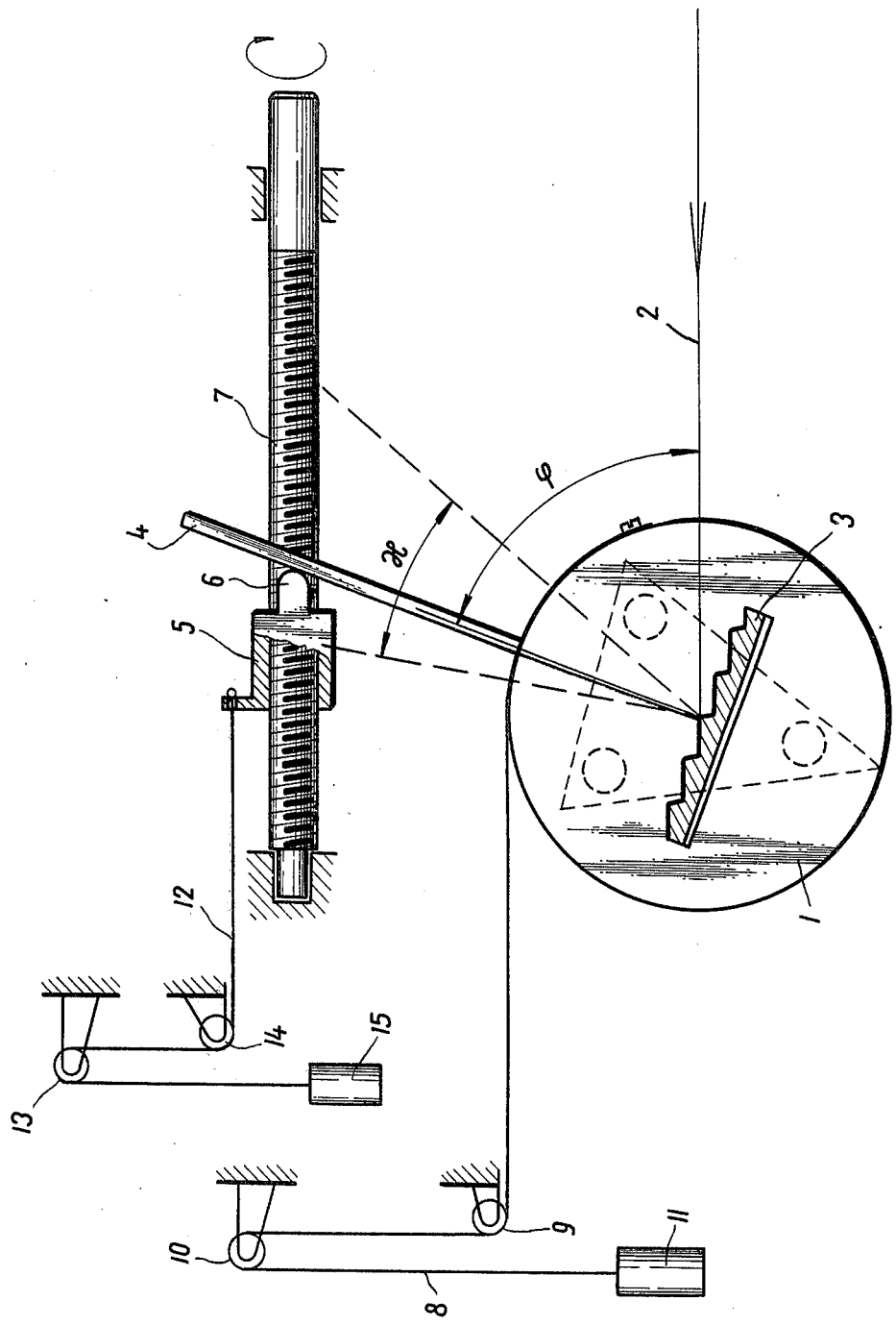

4,003,657

ROTATING SUPPORT TABLE AND DRIVE FOR AN ECHELLE GRATING

BACKGROUND OF THE INVENTION

This invention relates to an arrangement for rotating a diffraction grating in a spectral device within the scanning angle, wherein a light beam impinges on the grating at a large angle of approximately 60°.

Known sine and cosecant control devices, suitable for common types of diffraction gratings, i.e., of gratings used at small angles of impingement of light beams, cannot be applied for gratings adapted to work at large angles of impingement with respect to light beams, for kinematic reasons. The known arrangement of a sine control device includes an arm fixed at one end to the rotatable table which supports the diffraction grating. The arm slides by means of a spherical or cylindrical cam, fixed on its other end, along a straight strip. The strip is fixed to an element moving along a straight line in a direction perpendicular to the movement of this element. This element can be for instance a nut on a motion screw. The straight strip is fixed on the nut to extend in a direction perpendicular to its longitudinal axis. The motion screw is situated so that its axis does not point towards the center of the rotatable table and is also not parallel with the direction of light beams impinging on the diffraction grating. This arrangement provides a linear distribution of the spectrum according to wave lengths λ.

The arrangement of a known cosecant control device includes an arm fixed at one end to the rotatable table which supports a diffraction grating. The other end of the arm is provided with a planar strip. The plane of the strip points to the center of rotation of the rotatable table. The arm rests, by means of this planar strip, against a spherical or cylindrical cam fixed to an element moving along a line pointing equally to the center of rotation of the table and parallel with the direction of light beams impinging on the diffraction grating. This element can be for instance a nut driven by a screw bolt. The cam in this case is fixed to extend in the direction of the longitudinal axis of the nut. This arrangement provides a distribution of the spectrum according to wave numbers (cm$^{-1}$).

These arrangements are for gratings of the echelle type substituted by different kinds of control devices. They have the drawback, however, that they do not provide linearly distributed spectra behind the exit slot of the spectral device, either in wave numbers or in wave lengths.

SUMMARY OF THE INVENTION

It is an object of this invention to provide an arrangement which enables the use of diffraction gratings of the "echelle" type with actually manufactured spectral apparatus.

This object has been achieved by the design of a rotatable device for the grating of the echelle type. The arrangement comprises a rotatable table with a diffraction grating. The table is connected to an arm, controlled by a cam on a nut. The nut is supported by a motion screw bolt. The longitudinal axis of the bolt is parallel to the light beam impinging on the diffraction grating, whereby this axis simultaneously passes beyond the center of rotation of the table. In addition both the rotating table or its arm, and the nut, or the dam, are connected to elements, for instance strings and weights, which generate a uniform force, acting always in a direction opposite to the nut or to the cam. Thus, the invention provides an arrangement wherein a linearly distributed spectrum according to wave numbers (cm$^{-1}$) is provided behind the output slot of the spectral device, with a diffraction grating operating at different spectral orders at a large impinging angle of the light beam on the grating.

The kinematic arrangement of elements of the control device defines accurately each instantaneous position of each of its elements and thus secures a perfect stiffness of the whole arrangement and also the reproducibility of measurements. In addition the mutual arrangement of its elements is chosen so as to achieve in the course of turning the diffraction grating, operating at a large impinging angle of the light beam (about 60°) a linear distribution of the obtained spectrum according to wave numbers (cm$^{-1}$) behind the exit slot of the spectral device within its whole scanning range.

DESCRIPTION OF DRAWING

An exemplary embodiment of an arrangement in accordance with the invention is shown in the attached drawing in a schematic outline.

DESCRIPTION OF PREFERRED EMBODIMENT

The arrangement of the invention for the control of the diffracting grating is comprised of a rotatable table 1, in the center of which a diffraction grating 3 is situated. A light beam 2 impinges on the grating 3 at a large angle $\phi$, for instance 60°. The axis of rotation of the table extends in the plane of the ruled surface of the diffraction grating 3. A control arm 4 is fixed to the table 1, the free end of arm 4 resting against a cam 6. Preferably the contact surface of said arm 4, which is in contact with said cam 6 must be directed into the rotational center of the table 1. Said cam may be of spherical or cylindrical shape. This cam 6 is fixed to a nut 5 which is threaded to move in a straight line and uniformly on a motion screw 7. The axis of this screw 7 is parallel to the axis of the light beam 2 which impinges on the diffraction grating 3. A second condition is that the axis of this screw does not point to the center of rotation of the table 1.

In order to eliminate play due to clearances of the control elements, the arm 4 in table 1 is maintained in contact with the cam 6 by means of a string 8 attached to the table 1 for example by means of a screw and stressed over rollers 9 and 10 by a weight 11. Similarly the play due to clearance between the nut 5 and the motion screw 7 is eliminated by means of a string 12 fixed to the nut 5 and stressed over rollers 13 and 14 by a weight 15.

The rotation of the table 1 with the diffraction grating 3 is accomplished within the range of the scanning angle H so that with uniform turning of the motion screw 7, the spectrum created by the diffraction grating subsequently comes into the exit slot of the spectral device linearly distributed according to wave numbers (cm$^{-1}$). The mutual arrangement of elements of the device for control of the diffraction grating 3 complies with the condition that the ratio between a change of the wave number in the exit slot of the diffraction grating of the spectral device and between the change of position of the cam 6 is constant.

The arrangement for control of the diffraction grating is particularly suitable for apparatus operating in the infrared range with diffraction gratings of high quality of the echelle type, which can be used also for high spectral orders, where it is desirable to obtain a linear distribution of the spectrum according to wave numbers.

While the invention has been disclosed with reference to a limited number of embodiments, it will be apparent that variations may be made therein, and it is intended in the following claims to cover each such variation and modification as falls within the true spirit and scope of the invention.

What is claimed is:

1. In an arrangement for the control of a diffraction grating wherein a light beam is directed to impinge on the grating; the improvement comprising a rotatable table having a substantially planar top surface, said diffraction grating being supported on said table, the lines of said grating being perpendicular to said top surface on said table, a control arm fixed to said table, a nut having a cam, said control arm being positioned to rest against said cam, a motion screw, the axis of said motion screw being parallel to said light beam at the point of impingement and pointing in a direction which does not intersect the center of rotation of the rotatable table, said nut being threaded on said screw, whereby rotation of said screw transmits a linear movement to said nut and cam.

2. Arrangement as in claim 1, comprising means for eliminating play due to clearances between said arm and said cam and between said nut and said motion screw.

3. The arrangement of claim 1, wherein said diffraction grating is an echelle grating.

4. The arrangement of claim 1, wherein said cam has a circular cross section.

5. The arrangement of claim 1, wherein the contact surface of said arm extends radially with respect to the axis of rotation of said table.

6. The arrangement of claim 1, wherein the angle between said beam and said grating is substantially 60°.

7. The arrangement of claim 2, wherein said means for eliminating play comprises a first string affixed to said table, a first weight connected to said first string for urging said arm against said cam, a second string connected to said nut, and a second weight affixed to said second string for urging said nut in one longitudinal direction with respect to said screw.

* * * * *